April 19, 1927.
L. H. CROSS
TIRE COVER
Filed Nov. 19, 1926
1,625,593
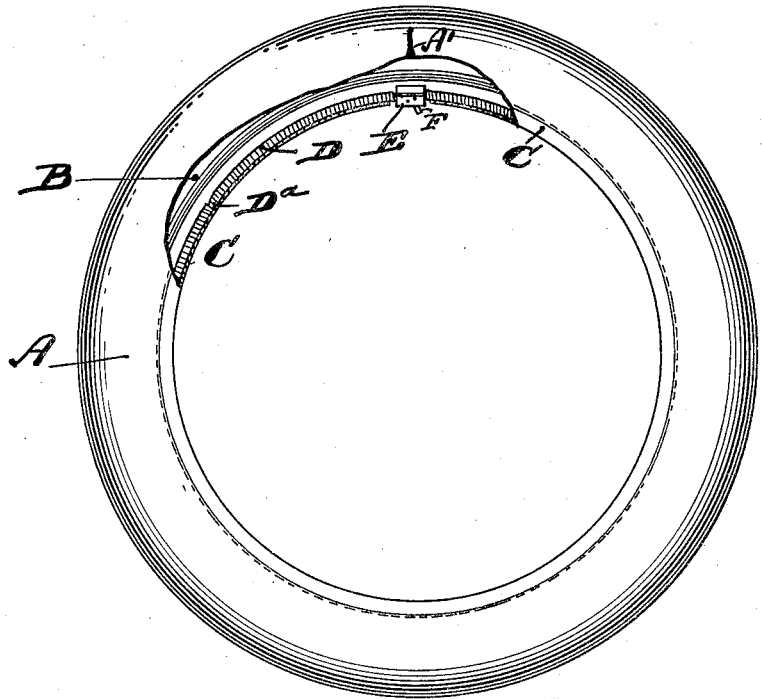
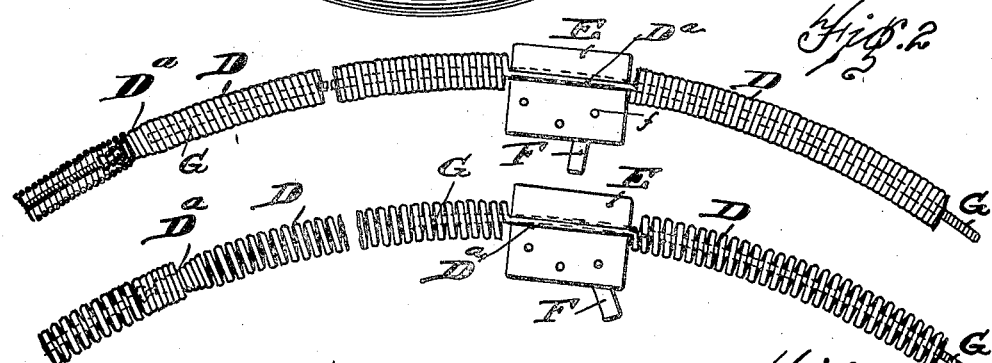
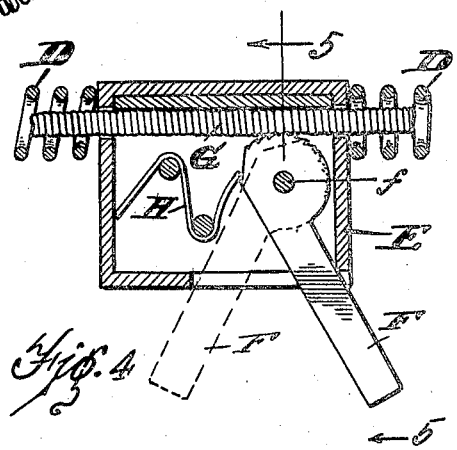
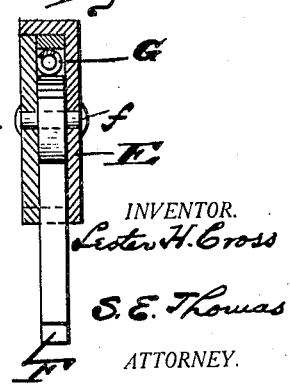
INVENTOR.
Lester H. Cross
BY S. E. Thomas
ATTORNEY.

Patented Apr. 19, 1927.

1,625,593

UNITED STATES PATENT OFFICE.

LESTER H. CROSS, OF DETROIT, MICHIGAN, ASSIGNOR TO C. M. SMILLIE & COMPANY, OF DETROIT, MICHIGAN, A CORPORATION OF MICHIGAN.

TIRE COVER.

Application filed November 19, 1926. Serial No. 149,326.

My invention relates to a tire cover shown in the accompanying drawings and more particularly described in the following specification and claims.

The object of the present invention is to provide a device which is adapted to hold a tire cover "closed" until it is desired to remove the tire from the case and then to maintain the case in an "open" position so that the tire may be readily removed.

There are devices upon the market for holding a tire cover closed, but when it becomes necessary to remove or replace a tire, no means have been provided for holding the cover "open" so that the tire may be readily removed or replaced.

Another object of the present invention is to provide means which are not only adapted to hold the case in an "open" position, but which upon releasing the holding device will automatically draw the cover snugly around the tire so as to present a smooth neat appearance.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a side elevation of a tire case with a portion broken away showing a spiral spring ring or hoop and a locking device, supported in a hem formed at the edge of the tire cover.

Figure 2 is a fragmentary elevation of the spiral spring supporting the locking device as it would appear before being distended to "open" the tire cover.

Figure 3 is a similar view showing the spring expanded as when "open" to remove or replace a tire in the case.

Figure 4 is a longitudinal sectional view through the locking device showing it supported by a fragment of the spring and a non-elastic coiled thrust rod extending through the housing.

Figure 5 is a cross-sectional view through the locking device taken on or about line 5—5 of Figure 4.

Referring now to the letters of reference placed upon the drawings:

A denotes a tire cover with a radial slit $A^1$ in the cover to provide an opening for convenience in inserting a tire B in the case. C denotes a hem in which is housed a coiled spring D tapering at one end as indicated at $D^a$—that it may be screwed into the opposite end of the spring to form a ring. E is a lock housing enclosing a ratchet lever F pivoted at $f$ between the walls of the housing. Lodged within the spring and secured to its tapering end is a coiled wire non-elastic thrust rod G extending through the housing where it is engaged by the ratchet lever. H denotes a spring, one end of which bears against the wall of the housing and the other against the ratchet lever F to hold the latter against accidental release when adjusted to engage the thrust rod.

The convolutions in the spring D at approximately ten inches from its tapering end are omitted and the wire straightened at ($D^a$), that it may overlap the wall of the ratchet lever housing, the convolutions of the spring bearing against the side walls of the ratchet lever housing, while the coiled wire thrust rod G extending through the housing serves with the spring to secure the housing against displacement.

Having now indicated the several parts by reference letters, the construction and operation of the device will be readily understood.

When it is desired to "open" the cover that a tire may be removed or housed therein, the operator grasps the spring D adjacent to its inserted tapering end with one hand and the spring and locking device with the other hand and upon pulling in opposite directions the spring is distended, thereby opening the gap $A^1$ provided in the wall of the cover so that a tire may be readily removed or inserted upon placing the cover over the tire.

Upon distending the spring, the lever F is turned so that its ratchet teeth will engage the corrugated edge of the thrust rod G,—secured only at one end to the tapering end of the spring. The spring is thus held by the thrust rod in its distended condition until the thrust rod is released by the operator shifting the ratchet lever to the position indicated in dotted lines in Figure 4, whereupon the cover is drawn by the contraction of the spring snugly upon the tire.

Having thus described my invention what I claim is:

1. In a device of the character described, a tire cover; a coiled spring having its ends connected together to form a ring lodged in a hem of the cover; a rod housed within the spring ring having one end only attached to the spring; means adapted to engage said rod, whereby upon distending the spring to open the cover the spring may be held distended by the rod while engaged by said means until manually released.

2. In a device of the character described, a tire cover; a coiled spring having its ends connected together to form a ring lodged in a hem of the cover; a non-elastic coiled wire rod housed within the spring ring having one end only attached to the spring; a ratchet lever adapted to engage said rod, whereby upon distending the spring to open the cover the spring may be held distended by the non-elastic wire rod while engaged by the ratchet lever and until manually released by the operation of said lever.

3. In a device of the character described, a tire cover; a coiled spring having its ends connected together to form a ring lodged in a hem in the cover; a non-elastic coiled wire rod housed within the spring ring having one of its ends only attached to the spring, whereby the spring may be expanded independently of the rod; a housing for a ratchet lever supported between spaced convolutions of the spring, said non-elastic coiled wire rod being free to move through openings in the ratchet lever housing; a spring controlled ratchet lever journalled between the walls of the housing, whereby upon manually distending the spring ring to open the slitted cover, the spring may be held distended by the ratchet lever engaging the coiled wire rod until manually released, whereupon the cover through the contraction of the spring is adapted to snugly fit the tire.

4. In a device of the character described, a tire cover provided with a slitted opening to facilitate the insertion or removal of a tire; a coiled spring having its ends connected together to form a ring lodged in a hem in the cover; a non-elastic coiled wire rod housed within the spring ring having one of its ends only attached to the spring, whereby the spring may be expanded independently of the rod; a housing for a ratchet lever supported between spaced convolutions of the spring, said non-elastic coiled wire rod being free to move through openings in the ratchet lever housing; a spring controlled ratchet lever journalled between the walls of the housing, whereby upon normally distending the spring ring to open the slitted cover, the spring may be held distended by the ratchet lever engaging the coiled wire until manually released, whereupon the cover through the contraction of the spring is adapted to snugly fit the tire.

In testimony whereof, I sign this specification.

LESTER H. CROSS.